United States Patent [19]

Dangel

[11] 4,372,418
[45] Feb. 8, 1983

[54] FRONT SET OF WHEELS FOR AN AUTOMOBILE VEHICLE

[75] Inventor: Henry L. A. Dangel, 7 Rue du Sillon, 68100 Mulhouse, France

[73] Assignee: Henry Leon Albert Dangel, Mulhouse, France

[21] Appl. No.: 185,099

[22] Filed: Sep. 8, 1980

[30] Foreign Application Priority Data

Sep. 13, 1979 [FR] France ............................... 79 22854

[51] Int. Cl.³ ............................................ B60K 17/30
[52] U.S. Cl. .................................... 180/256; 280/667; 280/668; 280/675
[58] Field of Search ................. 180/254, 256; 280/666, 280/667, 668, 670, 674, 675, 696

[56] References Cited

U.S. PATENT DOCUMENTS

| 3,068,022 | 12/1962 | Fiala | 280/667 |
| 3,283,842 | 11/1966 | Watt | 180/256 |
| 3,492,018 | 1/1970 | Burckhardt et al. | 280/674 |

FOREIGN PATENT DOCUMENTS

| 1051204 | 1/1954 | France | 280/670 |
| 1093808 | 5/1955 | France | 280/670 |
| 2299982 | 9/1976 | France | 280/668 |

Primary Examiner—Joseph F. Peters, Jr.
Assistant Examiner—Ross Weaver
Attorney, Agent, or Firm—Lee, Smith & Jager

[57] ABSTRACT

Each half set of wheels comprises a telescopic shock absorber - suspension spring assembly which is fixed in its upper part to the body of the vehicle and is rigid in its lower part with, on one hand, a ball of a ball joint articulation of a suspension arm and, on the other hand, a hub support. The hub support comprises a stub-axle supporting side member connected by upwardly extending inclined branches to the sleeve supporting the body of the shock absorber. In its lower part, the side member carries a second ball joint articulation of a lower suspension arm and the transverse transmission extends between the lower and upper suspension arms. The centers of the two ball joint articulations are in alignment on the axis of the shock absorber.

10 Claims, 4 Drawing Figures

FRONT SET OF WHEELS FOR AN AUTOMOBILE VEHICLE

DESCRIPTION

The present invention relates to a front set of driving wheels for an automobile vehicle which is more particularly adapted to the construction of a front set of driving wheels for a vehicle having four driving wheels such as overland vehicles.

It is well known that the conversion of a conventional rear drive vehicle having front steering wheels into a cross-country vehicle, i.e. a vehicle having four driving wheels, requires practically the complete change of the front set of wheels, which is complicated and expensive for the constructor or for the person who desires to effect the conversion.

It is also known that suspensions in which the shock absorber and suspension spring assembly is rigid with a hub support pivotally mounted on a suspension triangle has the drawback of exerting high bending forces on the shock absorber rod with the risk of dammage in the region of the bearing which guides this rod relative to the body of the shock absorber.

On the other hand, in suspensions comprising two triangular structures, namely a lower and an upper triangular structure, and a shock absorber and suspension spring assembly pivotally mounted on the upper arm, all the force is transmitted to the triangular structures and the connections between these triangular structures, and, on one hand, the hub support and, on the other hand, the structure of the vehicle, are very highly stressed.

An object of the present invention is to overcome these drawbacks and to provide a front driving set of wheels which is capable of easy adaptation to vehicles of conventional type and does not have the drawbacks of the arrangements described hereinbefore.

According to the invention, there is provided a front set of wheels comprising a telescopic shock absorber-suspension spring assembly fixed to a hub support and connected by a ball-joint articulation to a suspension arm, wherein the hub support is connected by a second ball joint articulation to a second suspension arm, the centres of the two ball joint articulations being in alignment on the axis of the shock absorber-suspension spring assembly.

The ensuing description of one embodiment which is given merely by way of example and shown in the accompanying drawings will bring out the advantages and features of the invention.

Figure 1:
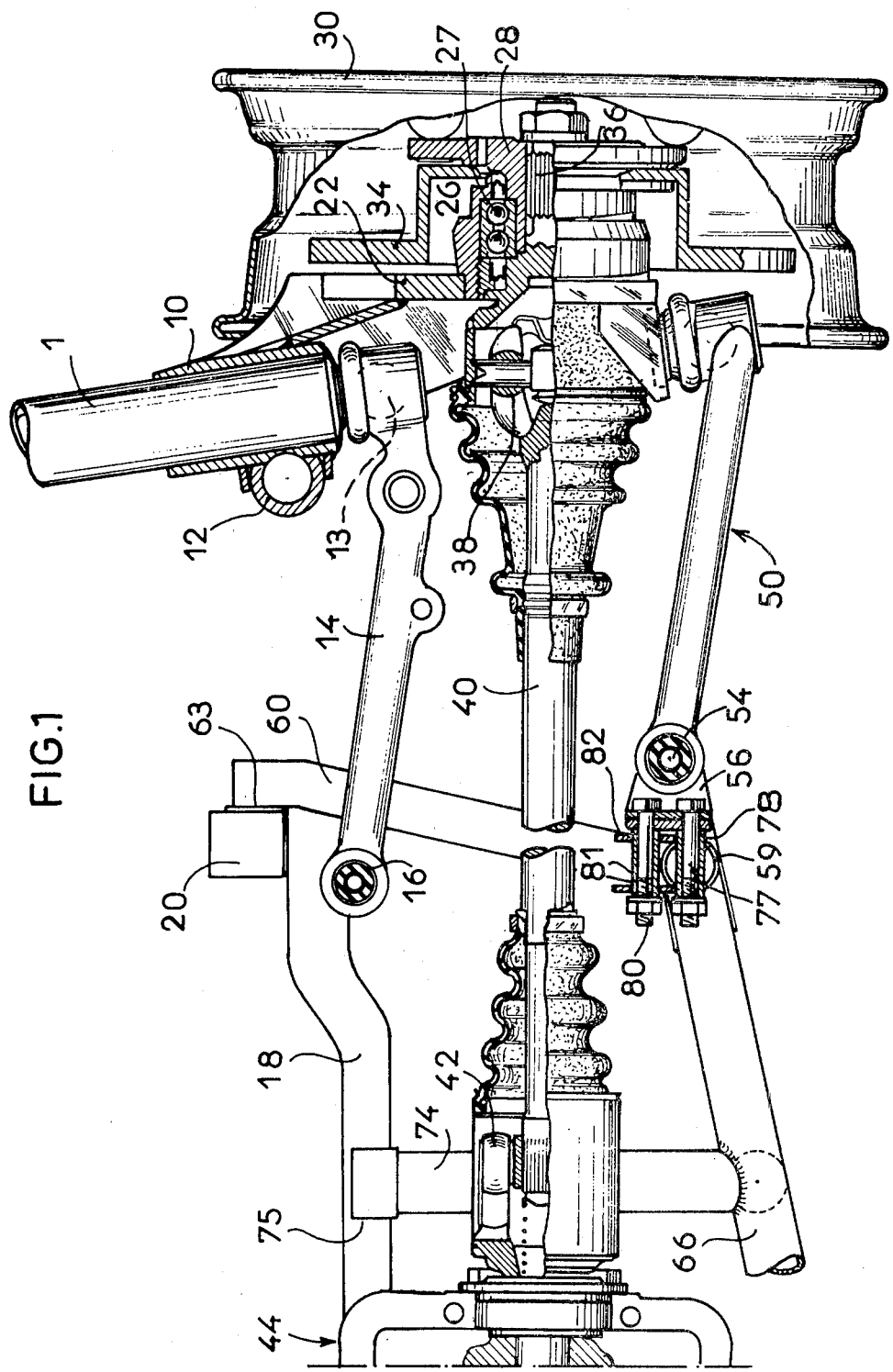
FIG. 1 is a view partly in section and partly in elevation of one half of a front set of driving wheels according to the invention, only the lower part of the body of the shock absorber or the stub-axle pivot being however shown in this Figure.
Figure 2:
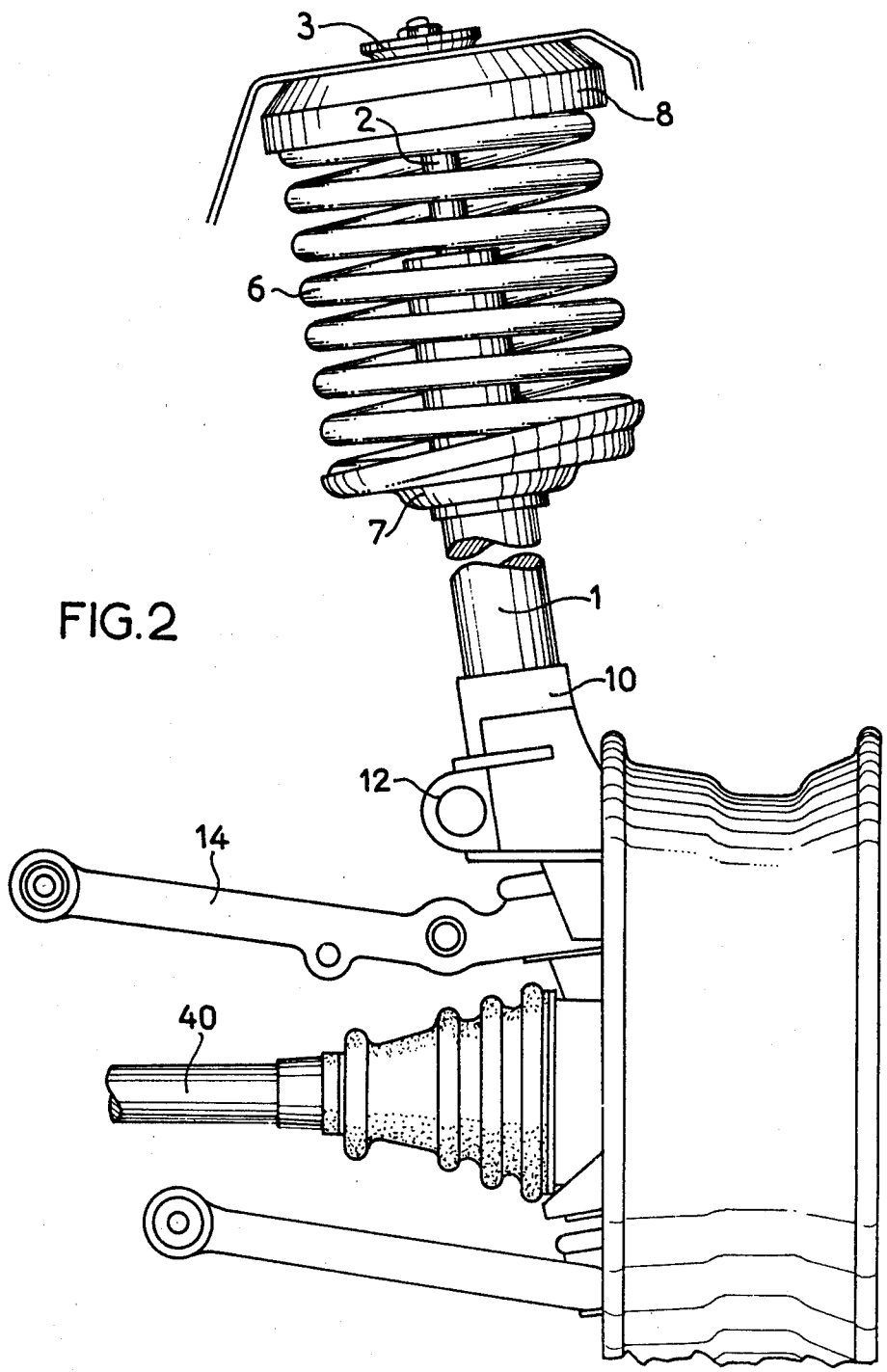
FIG. 2 is a diagrammatic elevational view of the side part of one half of the front set of wheels of FIG. 1 showing the wheel suspension.

As shown more particularly in FIGS. 1 and 2, the front set of wheels of the invention is of the integrated telescopic shock absorber type, and comprises a telescopic shock absorber 1 whose rod 2 is connected at a point 3 of the body 4 of the vehicle by means of an upper support of the suspension element. A suspension spring 6 is mounted around the shock absorber 1 between an upper cup 8 fixed to the support of the suspension element and a lower cup 7 fast with the body of the shock absorber 1.

In its lower part, the body of the shock absorber 1 is fixed in a sleeve 10 which carries a cylindrical collar 12 for fixing a steering lever (not shown in the drawings) which is substantially perpendicular to the sleeve 10. At the end of the sleeve 10, the body of the shock absorber 1 carries a ball joint articulation of a suspension arm or triangular structure 14 each of the branches of which is fixed at its end by means of a silent block 16 on a cross-member 18 which interconnects the two side members 20 of the body of the vehicle.

Figure 3:
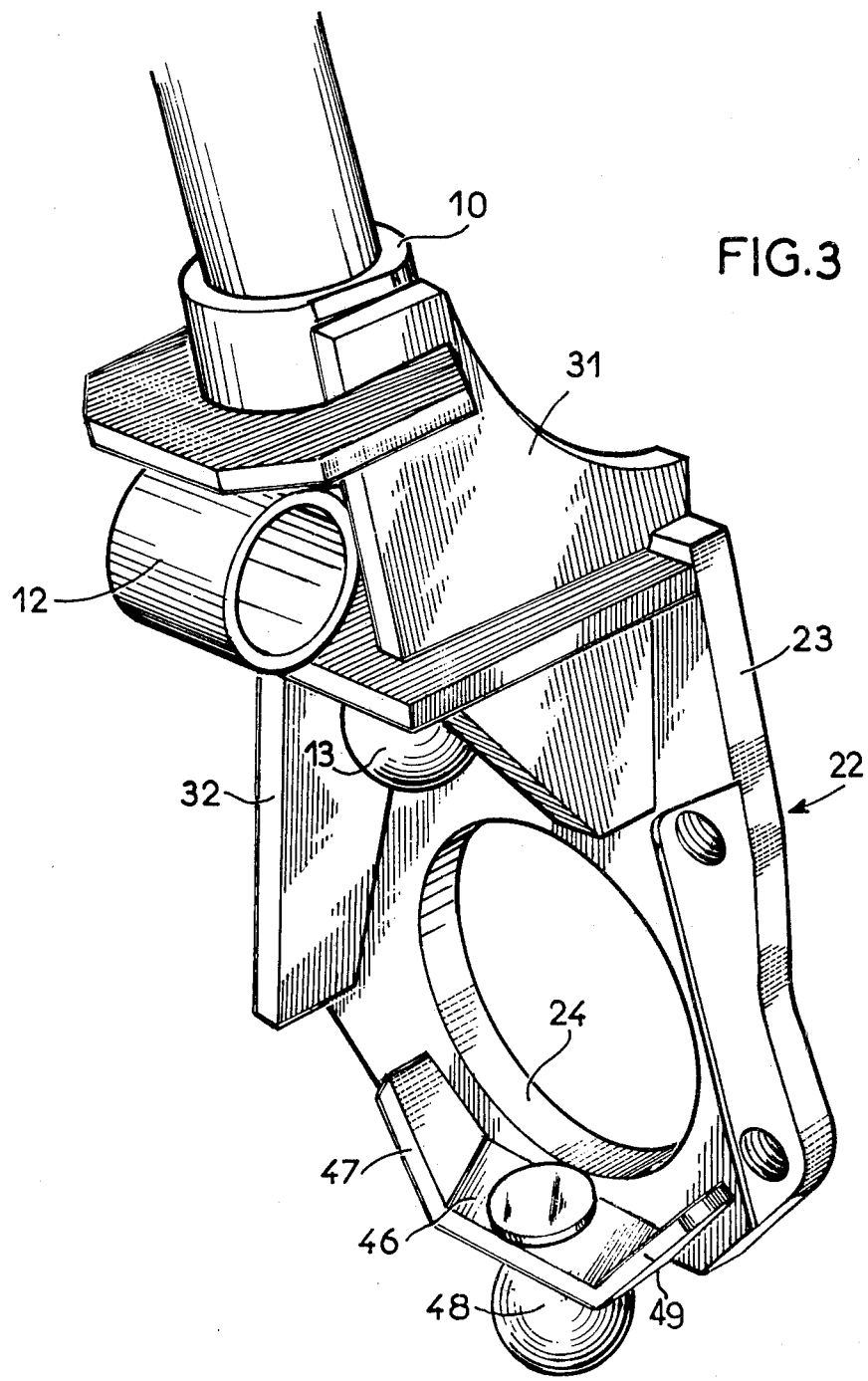
FIG. 3 is a perspective view of the hub support which is rigid with the lower part of the shock absorber body, and, FIG. 4 is a plan view of the lower suspension triangular structure and its cradle mounting it on the body of the vehicle.

The sleeve 10 of the support of the body of the shock absorber 1 is also rigid with a hub support generally designated by the reference numeral 22 and shown more particularly in FIG. 3. This hub support comprises a flat side member 23 provided with a circular aperture 24 in which there is fixed a stub-axle 26 which is mounted around the hub 28 of the wheel 30 by means of a ball bearing 27. The side member 23 is connected to the sleeve 10 by two lateral flanges 31 and 32 which are fixed at two diametrally opposed points of the outer surface of the sleeve 10 and are extended laterally and downwardly relative to this sleeve to below the ball joint articulation 13 of the suspension triangular structure 14. The axis of the stub-axle 26 is forwardly offset relative to that of the body of the shock absorber 1.

A brake disc 34 is of course mounted in the wheel 30 around the hub 28. Moreover, this hub 28 is internally splined and made to rotate with an externally splined shaft section 36. The shaft section 36 is connected by means of a universal joint 38 to a transverse transmission shaft 40 connected through a homokinetic internally sliding tripod joint 42 to a differential unit 44 which is connected by a longitudinal transmission (not shown) to the engine of the vehicle.

Figure 4:
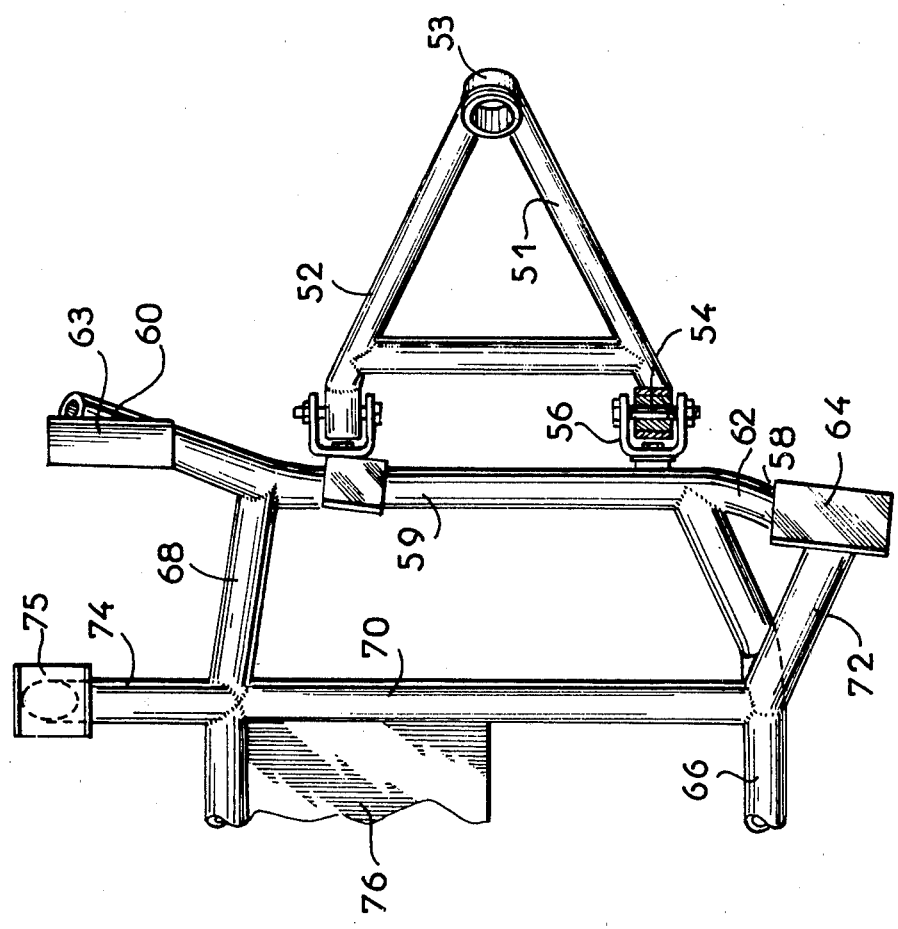

The side member 23 is rigid in its lower part below the circular aperture 24 with a plate 46 which is perpendicular thereto and is preferably provided with two divergent lateral branches 47 and 49 respectively. The plate 46 carries a ball joint articulation 48 for the lower suspension triangular structure 50. The articulation 48 is centered on the longitudinal axis of the shock absorber 1 which also passes through the centre of the ball joint articulation 13 of the upper suspension arm 14. Thus the two branches 47 and 49 are on each side of a universal joint 38 and protect this joint. Further, the lower triangular structure 50 has two arms 51 and 52 which extend from a ball joint box 53 and are pivotally mounted at their ends remote from this box on a shaft 54 carried by a fork member 56 which is anchored in a cradle 58 fixed to the main chassis of the vehicle (FIG. 4).

The cradle 58 has a rectilinear tube 59 whose two end portions are upwardly bent and form two inclined arms 60 and 62 respectively fixed at their ends to the side member 20. Each of the arms 60 and 62 has a fixing gusset 63 and 64 respectively, the two gussets facing in opposite directions and consequently bearing against opposed sides of the side member 20. The two longitudinal tubes 59 of the two half sets of wheels are interconnected by two transverse tubes 66 and 68 respectively. A bracing tube 70 parallel to the tube 59 reinforces the cradle between the tubes 66 and 68 and is extended at one end by an inclined tube 72 connected to the gusset 64 of the arm 62 and, at the other end, by a tube 74 which terminates in a U-section channel 75 fixed to a front cross-member of the chassis. A bottom plate 76 is preferably mounted between the two transverse tubes 66 and 68 and the bracing tubes 70 of the two half front set of wheels so as to protect the set of wheels assembly, and above all the transmission, from stones, mud or other elements coming from the ground.

Each of the fork members 56 is fixed to the tube 59 by means of a bolt 77 which extends through a sleeve 78 mounted diametrally in the tube 59. This fixing means is reinforced by a second bolt 80 placed in a sleeve 81 which extends diametrally through a tube 82 which has a substantially vertical axis. The tube 82 can be limited to a section of a tube adapted to reinforce the fixing of the fork member 56 as shown in FIG. 1 or may be upwardly extended to the side member 20 to which it is connected by a gusset similar to the gussets 63 and 64. This third gusset and the tube carrying it and the side member 20 have not been shown in FIG. 4 in order to avoid complicating this Figure.

The cradle assembly 58 may be fixed to the side member 20 and to the front cross-member of the chassis without any displacement or modification of these elements. Consequently, the installation of the lower suspension arm 50 requires no disassembly or modification of the conventional suspension.

Note that the presence of two suspension triangular structures employed with a shock absorber rigid with the hub support was *a priori* to be avoided, since the centre of the lower ball joint articulation 48 does not describe an arc of a circle in the course of the vertical movement of the wheel 30, whereas the ball joint articulation 13 rigid with the body of the shock absorber 1 moves in an arc of a circle around the axis of the articulation of the arm 14 on the cross-member 18. Now, it has been found surprisingly that, within the effective movement, the centre of this articulation 48 describes a complex curve which is sufficiently close to an arc of a circle to enable the differences to be absorbed in the region of the elastic articulations mounting the lower triangular structure on the cradle. It has been found that this arrangement effectively relieves the suspension elements from stress both in the longitudinal direction and in the transverse direction while retaining the possibilities of vertical movement and pivotal movement of the wheel 30.

The interest of such a mounting of a double triangular structure on a conventional McPherson front set of wheels when the latter is converted into a driving set of wheels is considerable since:

1. The bending forces supported by the shock absorber rod are practically eliminated.
2. The lateral forces exerted on the ball joint articulations of the pivot transmitted by the triangular structures to the anchoring points adjacent the chassis are better distributed.
3. From the point of view of safety, in the case of fracture of a suspension triangular structure or of an upper or lower ball joint articulation, the wheel remains perfectly held in position and retains all of its functions.

There is consequently provided a front driving set of wheels which may be easily mounted on a vehicle having a front set of wheels of conventional type so that the constructor can employ the same suspension elements for constructing vehicles having a rear driving set of wheels and vehicles having four driving wheels. The particular arrangement of this front set of wheels enables it to be employed as the original front set of wheels and to mount it directly on the vehicle in the course of its construction or to employ it when converting a vehicle having two driving wheels into a vehicle having four driving wheels.

Having now described my invention what I claim as new and desire to secure by Letters Patent is:

1. A front set of vehicle wheels comprising in combination, for each wheel of the set, a wheel hub support, an upper suspension arm, a suspension arm located below the upper arm and shorter than the upper arm, a telescopic shock absorber-suspension spring assembly having an axis of telescopic operation and fixed to the hub support at a lower end of the shock absorber-suspension spring assembly, means for connecting an upper end of the shock absorber-suspension spring assembly to the vehicle, a ball joint articulation connecting the telescopic shock absorber-suspension spring assembly to the upper suspension arm, and a second ball joint articulation connecting the hub support to the lower suspension arm, the two ball joint articulations having centres which are in fixed alignment on said axis of the shock absorber-suspension spring assembly and pivotal means provided adjacent to ends of the suspension arms opposed to said ball joint articulations for pivotally mounting the arms on the vehicle, said pivotal means of at least one of the arms being sufficiently elastically yieldable in operation of the arms for accommodating the fact that one of said ball joint articulations does not travel on an arc of a circle.

2. A front set of wheels as claimed in claim 1, in combination with a central differential and a hub supported by the hub support of each wheel, wherein a transverse transmission connects the hub to the central differential and extends between the two suspension arms of each wheel.

3. A front set of wheels as claimed in claim 1, comprising a tubular stub-axle support for each wheel, said shock absorber having a body and the hub support comprising a cylindrical sleeve for fixing to the body of the shock absorber, said sleeve being provided with two lateral downwardly extending branches which are fixed to a side member for supporting the tubular stub-axle support.

4. A front set of wheels as claimed in claim 3, wherein the hub support carries a ball joint support plate in the lower part of the hub support below the tubular stub-axle and on the opposite side thereof.

5. A front set of wheels as claimed in claim 1, in combination with side members of a chassis of the vehicle, and a cradle fixed to and under said side members, said lower suspension arm being pivotally mounted on the cradle and said upper suspension arm being pivotally mounted on the chassis.

6. A front set of wheels as claimed in claim 5, wherein the cradle comprises two tubes which are bent at end portions thereof and are each fixed by said end portions to a respective one of said side members.

7. A front set of wheels as claimed in claim 6, wherein the cradle comprises, in respect of each wheel, a second longitudinal tube which is parallel to the corresponding bent tube and is fixed at one end of the second longitudinal tube to a cross-member fixed to the chassis.

8. A front set of wheels as claimed in claim 6 or 7, further comprising a protecting plate mounted on the cradle below a transverse transmission for the wheels.

9. A front set of wheels as claimed in claim 1, wherein said pivotal means of said at least one of the arms comprises an elastomeric sleeve of the silent block type.

10. A front set of wheels as claimed in claim 1 or 9, wherein at least one of the arms is the lower arm.

* * * * *